(12) United States Patent  (10) Patent No.: US 8,296,476 B2
Zhang et al.  (45) Date of Patent: Oct. 23, 2012

(54) STORAGE METHOD, STORAGE SYSTEM, AND CONTROLLER

(75) Inventors: Wei Zhang, Chengdu (CN); Xianhong Lv, Chengdu (CN); Qi Wang, Chengdu (CN); Ruiqi Fan, Chengdu (CN)

(73) Assignee: Chengdu Huawei Symantec Technologies Co., Ltd., Sichuan (CN)

( * ) Notice: Subject to any disclaimer, the term of this patent is extended or adjusted under 35 U.S.C. 154(b) by 0 days.

(21) Appl. No.: 13/168,552

(22) Filed: Jun. 24, 2011

(65) Prior Publication Data

US 2011/0264833 A1 Oct. 27, 2011

Related U.S. Application Data

(63) Continuation of application No. PCT/CN2009/075168, filed on Nov. 27, 2009.

(30) Foreign Application Priority Data

Dec. 24, 2008 (CN) .......................... 2008 1 0187517

(51) Int. Cl.
G06F 3/00 (2006.01)
G06F 13/12 (2006.01)
G06F 13/38 (2006.01)
(52) U.S. Cl. .......................................... 710/17; 710/74
(58) Field of Classification Search ................ 710/74, 710/17

See application file for complete search history.

(56) References Cited

U.S. PATENT DOCUMENTS 6,757,778 B1 6/2004 van Rietschote
8,074,021 B1 * 12/2011 Miller et al. .................. 711/114

(Continued)

FOREIGN PATENT DOCUMENTS

CN 1540524 A 10/2004

(Continued)

OTHER PUBLICATIONS

International Search Report in corresponding PCT Application No. PCT/CN2009/074342 (Jan. 7, 2010). International Search Report in corresponding PCT Application No. PCT/CN2009/075168 (Mar. 4, 2010).
Written Opinion of the International Searching Authority in corresponding PCT Application No. PCT/CN2009/075168 (Mar. 4, 2010).
Extended European Search Report in corresponding European Application No. 09834066.4 (Sep. 27, 2011).
"PCI Express Base Specification," Mar. 28, 2005, Revision 1.2, PCI Express, Beaverton, Oregon.

*Primary Examiner* — Chun-Kuan Lee
*Assistant Examiner* — Farley Abad
(74) *Attorney, Agent, or Firm* — Leydig, Voit & Mayer, Ltd.

(57) ABSTRACT

A storage method, a storage system, and a controller are disclosed. The method is applicable to a system that includes at least one controller, at least two Peripheral Component Interconnection Express (PCIE) Input/Output (IO) modules, and at least two storage devices. The at least two storage devices are connected through a PCIE switch chip of the at least one controller, and the at least two PCIE IO modules are connected through a PCIE switch chip of the at least one controller. The method includes: receiving a request message from a server through the at least two PCIE IO modules; and accessing the at least two storage devices according to the request message. The at least two PCIE IO modules are shared between controllers, thereby saving resources; and the storage devices access the controllers without the need of a hard disk controller or a hard disk extension chip, thereby saving costs.

13 Claims, 3 Drawing Sheets

U.S. PATENT DOCUMENTS

| | | |
|---|---|---|
| 2005/0005062 A1 | 1/2005 | Liu et al. |
| 2006/0161709 A1 | 7/2006 | Davies |
| 2007/0098001 A1 | 5/2007 | Thomas |
| 2007/0124407 A1 | 5/2007 | Weber et al. |
| 2009/0089464 A1* | 4/2009 | Lach et al. ............ 710/62 |
| 2010/0088456 A1* | 4/2010 | Chu et al. ............. 710/316 |

FOREIGN PATENT DOCUMENTS

| | | |
|---|---|---|
| CN | 1812345 A | 8/2006 |
| CN | 1821946 A | 8/2006 |
| CN | 101149664 A | 3/2008 |
| CN | 101223498 A | 7/2008 |
| EP | 1681625 A2 | 7/2006 |

* cited by examiner

STORAGE METHOD, STORAGE SYSTEM, AND CONTROLLER

CROSS-REFERENCE TO RELATED APPLICATIONS

This application is a continuation of International Application No. PCT/CN2009/075168, filed on Nov. 27, 2009, which claims priority to Chinese Patent Application No. 200810187517.0, filed on Dec. 24, 2008, both of which are hereby incorporated by reference in their entireties.

FIELD OF THE INVENTION

The present invention relates to the field of information technologies, and in particular, to a storage method, a storage system, and a controller.

BACKGROUND OF THE INVENTION

With the boom of science and the prevalent application of computer technologies, the information on the Internet increases rapidly. Meanwhile, the e-commerce is developed continuously and an information system of an enterprise gains more and more leverage in the competitiveness of the enterprise, so that the amount of data of the enterprise increases quickly, and the enterprise is more and more dependent on data. Storage technologies also need to be developed continuously to store a large amount of data better and more quickly.

In the conventional art, a home controller needs to be designed on a Logical Unit Number (LUN) of a cache to simplify design of the cache. In this way, a request intended for a LUN is executed on the home controller. Controller_0 and controller_1 are connected through a minor channel. The mirror channel is connected to a minor chip of controller_0 and a minor chip of controller_1 respectively. A server is connected to a Peripheral Component Interconnection Express (PCIE) interface card of controller_0 and a PCIE interface card of controller_1 respectively through a switch network. Through a hard disk extension chip, controller_0 is connected to a hard disk that provides a conventional interface; through a hard disk extension chip, controller_1 is also connected to a hard disk provided with a conventional interface. Within a controller, the hard disk extension chip is connected to a PCIE switch chip through a hard disk controller, and the PCIE switch chip is respectively connected to the PCIE interface card, the minor chips, and the hard disk controller, and is connected to a chipset and a memory through a Central Processing Unit (CPU).

When the server sends a request, the request is sent to the controller through a preferred (the shortest) path. The server determines whether the controller is a home controller. If the controller is a home controller, this controller processes the request; if the controller is not a home controller, the controller forwards the request to the home controller, and the home controller processes the request. For example, the home controller of LUN_0 is controller_0. When the server sends a request intended for LUN_0 to controller_1 through a PCIE interface card n in the preferred path, if the server determines that controller_1 is not the home controller of LUN_0, controller_1 forwards the request intended for LUN_0 to the home controller of LUN_0. That is, controller_1 forwards the request intended for LUN_0 to controller_0 through a mirror channel, and controller_0 processes the request.

In the process of implementing the present invention, the inventors find at least the following problems in the conventional art:

Controller_0 and controller_1 have a stand-alone PCIE interface card which is unavailable to a peer controller, causing resource waste. A storage controller is inaccessible to a conventional hard disk without the need of a hard disk controller or a hard disk extension chip. The use of the hard disk controller and the hard disk extension chip causes a high controller cost.

SUMMARY OF THE INVENTION

The embodiments of the present invention provide a storage method, a storage system, and a controller so that storage devices and PCIE Input/Output (IO) modules are shared between controllers.

To achieve the above objective, an embodiment of the present invention provides a storage method, which is applicable to a system that includes at least one controller, at least two PCIE IO modules, and at least two storage devices. The at least two storage devices are connected through a PCIE switch chip of the at least one controller, and the at least two PCIE IO modules are connected through a PCIE switch chip of the at least one controller. The method includes:

receiving a request message from a server through the at least two PCIE IO modules; and accessing the at least two storage devices according to the request message.

An embodiment of the present invention provides a storage system, which includes at least one controller, at least two PCIE IO modules, and at least two storage devices. The at least two storage devices are connected through a PCIE switch chip of the at least one controller, and the at least two PCIE IO modules are connected through a PCIE switch chip of the at least one controller, where:

the controller is configured to receive a request message from a server through the at least two PCIE IO modules, and access the at least two storage devices according to the request message; and the at least two storage devices are configured to store information corresponding to the request message.

An embodiment of the present invention provides a controller, which is applicable to a system that includes at least one controller, at least two PCIE IO modules, and at least two storage devices. The at least two storage devices are connected through a PCIE switch chip of the at least one controller, and the at least two PCIE IO modules are connected through a PCIE switch chip of the at least one controller. The controller includes:

a receiving module, configured to receive a request message from a server through the at least two PCIE IO modules; and an accessing module, configured to access the at least two storage devices according to the request message.

Compared with the prior art, the embodiments of the present invention bring at least the following benefits:

At least two PCIE IO modules are connected by using a PCIE switch chip of a controller so that the at least two PCIE IO modules are shared between controllers, thereby saving resources; and at least two storage devices are connected by using the PCIE switch chip of the controller, and a storage device accesses the controller without the need of a hard disk controller or a hard disk extension chip, thereby saving costs.

BRIEF DESCRIPTION OF THE DRAWINGS

To make the technical solution under the present invention or in the prior art clearer, the following outlines the accompanying drawings involved in the description of the embodiments of the present invention or the prior art. Apparently, the accompanying drawings outlined below are illustrative rather than exhaustive, and persons of ordinary skill in the art can derive other drawings from such accompanying drawings without any creative effort.

DETAILED DESCRIPTION OF THE EMBODIMENTS

The following detailed description is given in conjunction with the accompanying drawings of the embodiments of the present invention to provide a clear understanding of technical solutions in the embodiments of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

Figure 1:
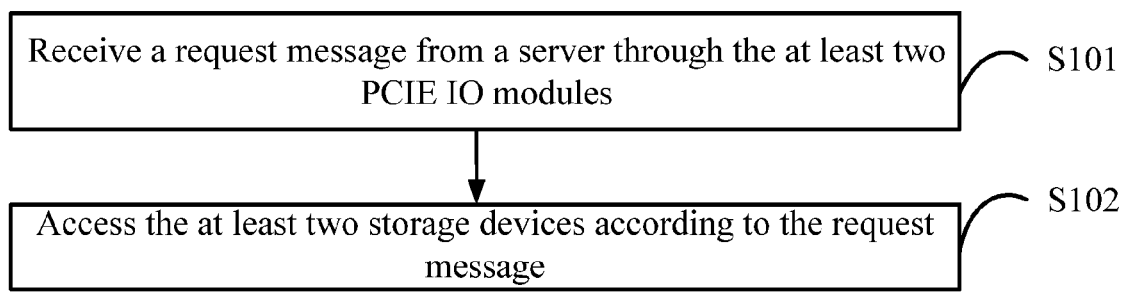
FIG. 1 is a flowchart of a storage method according to a first embodiment of the present invention.

FIG. 1 is a flowchart of a storage method according to a first embodiment of the present invention. The storage method is applicable to a system that includes at least one controller, at least two PCIE IO modules, and at least two storage devices. The at least two storage devices are connected through a PCIE switch chip of the at least one controller, and the at least two PCIE IO modules are connected through a PCIE switch chip of the at least one controller. As shown in FIG. 1, the storage method may include the following steps:

Step S101: Receive a request message from a server through the at least two PCIE IO modules.

Step S102: Access the at least two storage devices according to the request message.

The order of the steps of the method according to the embodiment of the present invention is adjustable according to practical requirements.

A storage device in this embodiment of the present invention may be a Solid-State Disk (SSD). In this embodiment, an entity that receives the request message from the server through the at least two PCIE IO modules may be a lightest-loaded server. The lightest-loaded server includes at least one of the following features: the smallest controller request number, the shortest controller response time, and the smallest controller CPU occupancy.

It can be seen that, in this embodiment, the at least two PCIE IO modules are connected by using the PCIE switch chip of the controller so that the at least two PCIE IO modules are shared between controllers, thereby saving resources; the at least two storage devices are connected by using the PCIE switch chip of the controller, and the SSD is used as a storage device in place of a conventional hard disk, so that the SSD accesses the controller without the need of a hard disk controller or a hard disk extension chip, thereby saving costs. Moreover, after the SSD is connected, the server can select the lightest-loaded controller according to the controller load so that the controller load is dynamically balanced.

Figure 2:
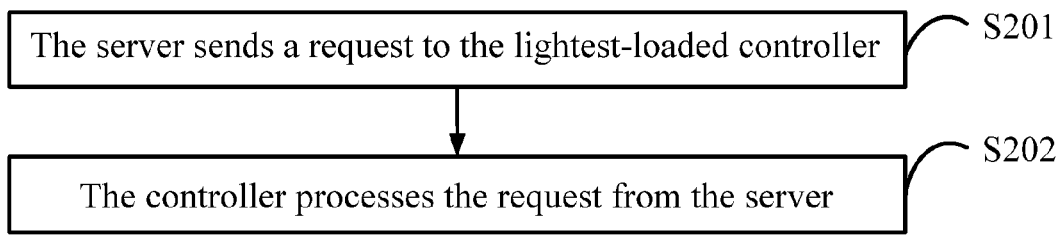
FIG. 2 is a flowchart of a storage method according to a second embodiment of the present invention.

FIG. 2 is a flowchart of a storage method according to a second embodiment of the present invention. As shown in FIG. 2, the storage method may include the following steps:

Step S201: A server sends a request to a lightest-loaded controller.

Specifically, the server may send the request to the lightest-loaded controller through multi-path software. The multi-path software is software capable of selecting a path automatically. That is, the multi-path software of the server can interact with the controller to select the lightest-loaded controller automatically, and send the request to the lightest-loaded controller. The request may be, but is not limited to, a request for performing a storage operation through a home controller. The lightest-loaded controller includes, but is not limited to, at least one of the following features: the smallest controller request number, the shortest controller response time, and the smallest controller CPU occupancy.

Figure 3:
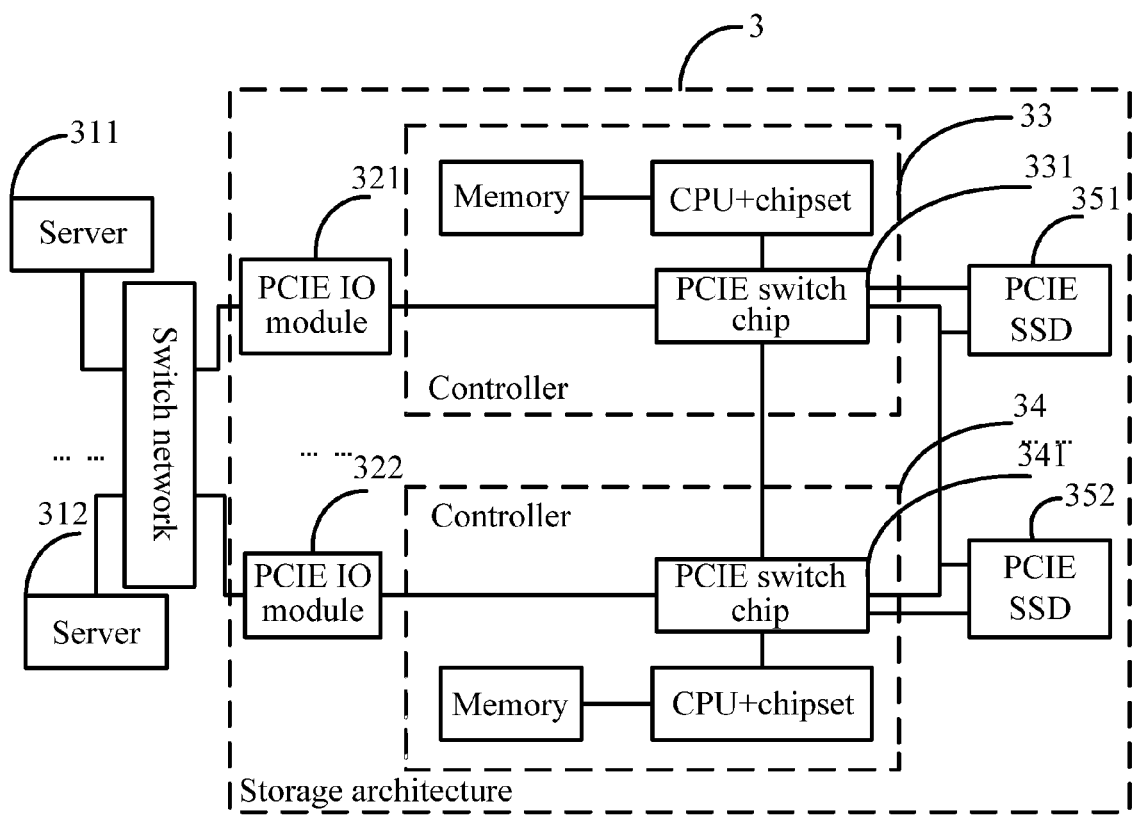
FIG. 3 is a structural diagram of a PCIE-interconnection-based storage architecture according to the second embodiment of the present invention.

In this embodiment, the controller may be a controller in a PCIE-interconnection-based storage architecture. FIG. 3 is a structural diagram of a PCIE-interconnection-based storage architecture according to the second embodiment of the present invention. As shown in FIG. 3, taking two controllers as an example, the storage architecture is illustrated. The storage architecture 3 includes PCIE IO modules, PCIE switch chips, controllers, and storage devices. The storage device may be a hard disk. The hard disk may be, but is not limited to, an SSD. In this embodiment, taking an SSD as an example, the storage device is illustrated. Multiple PCIE IO modules may be configured for one controller. In this embodiment, the SSD is taken as an example for illustration, and two PCIE IO modules, two PCIE switch chips, two controllers, and two PCIE SSDs are taken as an example for illustration. When the storage architecture 3 is used, the number of the PCIE IO modules, the number of the PCIE switch chips, the number of the controllers, and the number of the PCIE SSDs are selected arbitrarily according to practical requirements. The two controllers are a controller 33 and a controller 34; the two PCIE IO modules are a PCIE IO module 321 and a PCIE IO module 322. The two PCIE switch chips are located in the controllers, the PCIE switch chip 331 is located in the controller 33, the PCIE switch chip 341 is located in the controller 34, and the two PCIE SSDs are a PCIE SSD 351 and a PCIE SSD 352.

The PCIE switch chip 331 is connected to the PCIE switch chip 341, the PCIE IO module 321 is connected to the PCIE switch chip 331, and the PCIE IO module 322 is connected to the PCIE switch chip 341, so that the PCIE IO module 321 is interconnected to the PCIE IO module 322 between the two controllers, and the controller 33 and the controller 34 can share the PCIE IO module 321 and the PCIE IO module 322. Moreover, the PCIE SSD 351 is also connected to the PCIE switch chip 331, and the PCIE SSD 352 is also connected to the PCIE switch chip 341, so that the PCIE SSD 351 is interconnected with the PCIE SSD 352 between the two controllers, and the controller 33 and the controller 34 can access all PCIE SSDs. That is, the controller 33 and the controller 34 can share and access the PCIE SSD 351 and store information into the PCIE SSD 351. Likewise, the controller 33 and the controller 34 can further share and access the PCIE SSD 352 and store information into the PCIE SSD 352.

In this embodiment, the request received by the controller in the storage architecture 3 from the server is a request sent by a server 311 through a switch network, and the request received by the controller in the storage architecture 3 from the server may also be a request sent by a server 312 through the switch network, where the controller is the lightest-loaded controller.

Step S202: The controller processes the request from the server.

Specifically, when the request from the server is a storage operation request, the lightest-loaded controller stores information corresponding to the request into a PCIE SSD by accessing the PCIE SSD. For example, when the request from the server is a request for storing network information, and the lightest-loaded controller is the controller 33, after the controller 33 receives the request for storing network information from the server, the controller 33 stores the network information corresponding to the request into the PCIE SSD. In this embodiment, the controller 33 may store the network information into the PCIE SSD 351 or into the PCIE SSD 352.

The order of the steps of the method according to the embodiment of the present invention is adjustable according to practical requirements.

It can be seen that, in this embodiment, by using the PCIE switch chips, the PCIE IO modules are interconnected between the two controllers, so that the two controllers can share all PCIE IO modules, and resources of a PCIE interface card are saved.

Moreover, the SSD can access the controller directly without the need of a hard disk controller or a hard disk extension chip, so that the high cost caused by the use of the hard disk controller and the hard disk extension chip is saved. When a conventional hard disk is used to access a controller, and a CPU accesses a hard disk provided with a conventional interface, an access path of the CPU is in the following sequence: the CPU->a bridge chip of a PCIE bus->the PCIE bus->a hard disk controller->a hard disk extension chip->the hard disk. The conventional interface includes, but is not limited to, the Fiber Channel (FC) and the Serial Attached SCSI (SAS), where SCSI is an acronym of Small Computer System Interface (SCSI). With regard to the access time, the time of executing a CPU instruction is in the level of ns, the memory access delay is in the level of 10 ns, and the disk access time is in the level between 10 ms and 20 ms. After the access delay of a storage device needs to increase greatly (for example, increase to 0.1 ms), the access path of the CPU->the bridge chip of the PCIE bus->the PCIE bus->the hard disk controller->the hard disk extension chip->the hard disk suffers from a performance bottleneck. Through the foregoing access path, the access delay of the storage device cannot reach 0.1 ms. When the hard disk provided with the conventional interface is still used, performance requirements cannot be satisfied. In this case, the bus layer of the storage medium needs to be closer to the bus layer of the CPU and the memory, namely, the SSD needs to be used to access the controller directly. It can be seen from Table 1 and Table 2 that, performance indices of an SSD based on a PCIE interface is far higher than performance indices of a mechanical hard disk, where Table 1 shows the performance indices of the SSD based on the PCIE interface, and Table 2 shows the performance indices of the mechanical hard disk.

TABLE 1

| Read IOPS randomly at 4K | Write IOPS randomly at 4K | Read sequentially (MB/s) | Write sequentially (MB/s) |
|---|---|---|---|
| 107,000 | 96,000 | 700 | 600 |

TABLE 2

| Read IOPS randomly at 4K | Write IOPS randomly at 4K | Read sequentially (MB/s) | Write sequentially (MB/s) |
|---|---|---|---|
| 241 | 179 | 66 | 52 |

That is, in this embodiment, a high-performance nonvolatile SSD is used as a storage device of the system, no home controller needs to be designed on the LUN of the cache, and the request intended for a LUN can be executed on any controller, namely, the LUN can access the SSD through any controller. In this case, two SSDs are connected by using the PCIE switch chip of the controller, a path selected by the multi-path software of the server and a path between the controllers are in an equivalent relation, and no preferred path exists between the controllers. The multi-path software of the server can select a requested path according to the controller load so that the controller load is dynamically balanced.

Figure 4:
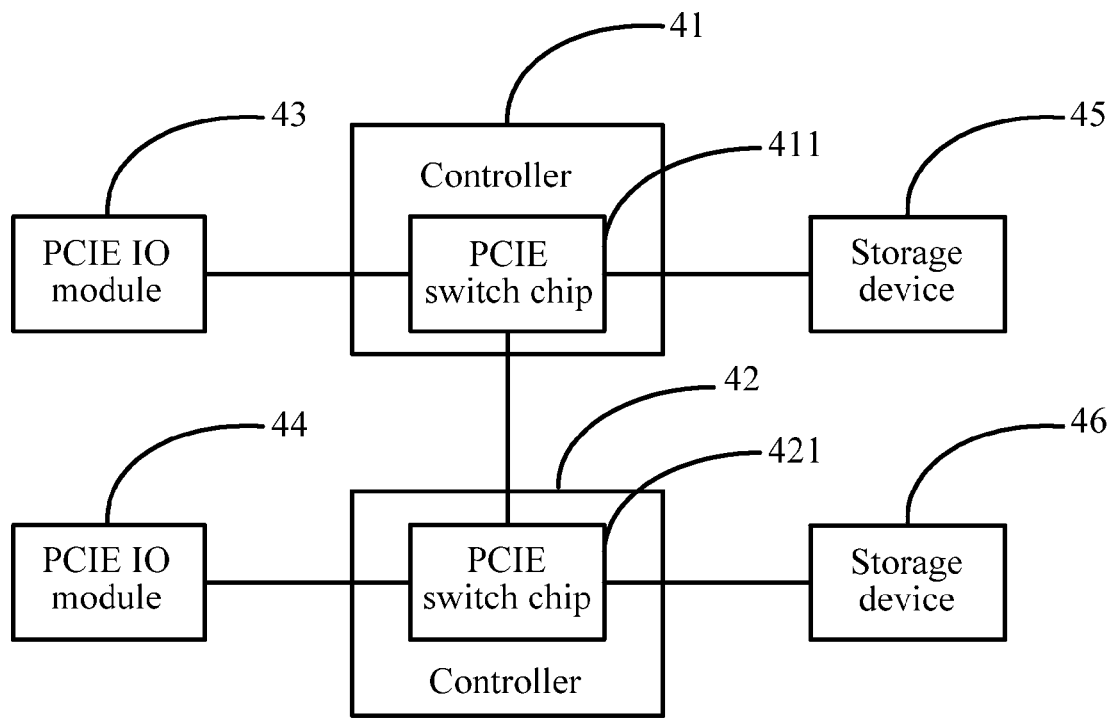
FIG. 4 is a structural diagram of a storage system according to a third embodiment of the present invention.

FIG. 4 is a structural diagram of a storage system according to a third embodiment of the present invention. As shown in FIG. 4, the system may include at least one controller, at least two PCIE IO modules, and at least two storage devices. The at least two storage devices are connected through a PCIE switch chip of the at least one controller, and the at least two PCIE IO modules are connected through a PCIE switch chip of the at least one controller. Multiple PCIE IO modules can be configured for one controller. In this embodiment, two controllers, two PCIE IO modules, and two storage devices are taken as an example for illustration. That is, the storage system includes: a controller 41, a controller 42, a PCIE IO module 43, a PCIE IO module 44, a storage device 45, and a storage device 46. The controller 41 includes a PCIE switch chip 411; the controller 42 includes a PCIE switch chip 421; the PCIE switch chip 411 is connected to the PCIE switch chip 421; the PCIE IO module 43 is connected to the PCIE switch chip 411; the PCIE IO module 44 is connected to the PCIE switch chip 421; the storage device 45 is connected to the PCIE switch chip 411; and the storage device 46 is connected to the PCIE switch chip 421. The controller 41 is configured to receive a request message from a server through the PCIE IO module 43, and is further configured to receive a request message from the server through the PCIE IO module 44. The controller 41 accesses the storage device 45 and the storage device 46 according to the request message. The type of the storage device may be, but is not limited to, an SSD. The storage device is configured to store information to be stored corresponding to the request message. In this embodiment, the controller 41 is a lightest-loaded controller. In this embodiment of the present invention, all units of the system may be integrated into one apparatus, or distributed on multiple apparatuses. The units may be combined into one unit, or further split into multiple subunits.

It can be seen that, in this embodiment, the at least two PCIE IO modules are connected by using the PCIE switch chips of the controllers so that the at least two PCIE IO modules are shared between the controllers, thereby saving resources; the at least two storage devices are connected by using the PCIE switch chips of the controllers; an SSD is used as a storage device in place of the conventional hard disk, so that the SSD accesses a controller without the need of a hard disk controller or a hard disk extension chip, thereby saving costs. Moreover, after the SSD is connected, the server can select the lightest-loaded controller according to the controller load so that the load of the controllers is dynamically balanced.

Figure 5:
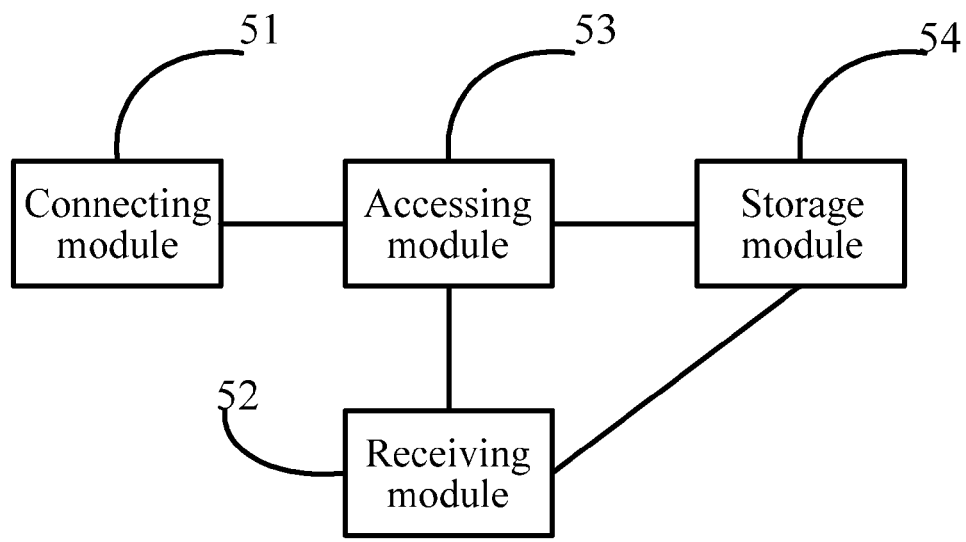
FIG. 5 is a structural diagram of a storage apparatus according to a fourth embodiment of the present invention.

FIG. 5 is a structural diagram of a storage apparatus according to a fourth embodiment of the present invention. This apparatus may be a controller, and the controller is applicable to a system that includes at least one controller, at least two PCIE IO modules, and at least two storage devices. The at least two storage devices are connected through a PCIE switch chip of the at least one controller, and the at least two PCIE IO modules are connected through a PCIE switch chip of the at least one controller. The controller may be a lightest-loaded controller. As shown in FIG. 5, the controller may include:

a connecting module 51, configured to connect the PCIE switch chips in the at least one controller so that the at least two storage devices are connected; the storage device may be, but is not limited to, an SSD;

or, configured to connect the PCIE switch chips in the at least one controller so that the at least two PCIE IO modules are connected;

a receiving module 52, configured to receive a request message from a server through the at least two PCIE IO modules;

an accessing module 53, configured to access the at least two storage devices connected to the connecting module 51 according to the request message received by the receiving module 52; and a storage module 54, configured to store information corresponding to the request message received by the receiving module 52 into the at least two storage devices when the accessing module 53 accesses a storage device, where the storage device may be, but is not limited to, an SSD.

The modules of the storage apparatus according to this embodiment of the present invention may be integrated or deployed separately. The foregoing modules may be combined into one module, or further split into multiple submodules.

It can be seen that, in this embodiment, the at least two PCIE IO modules are connected through the PCIE switch chips of the controllers so that the at least two PCIE IO modules are shared between the controllers, thereby saving resources; the at least two storage devices are connected by using the PCIE switch chips of the controllers; an SSD is used as a storage device in place of the conventional hard disk, and the SSD accesses the controller without the need of a hard disk controller or a hard disk extension chip, thereby saving costs. Moreover, after the SSD is connected, the server can select the lightest-loaded controller according to the controller load so that the load of the controllers is dynamically balanced.

After reading the foregoing embodiments, those skilled in the art are clearly aware that the present invention may be implemented through hardware, or through software plus a necessary universal hardware platform. Therefore, the technical solution under the present invention may be embodied in a software product. The software product may be stored in a nonvolatile storage medium (such as CD-ROM, USB flash disk, or mobile hard disk), and may include several instructions that enable a computer device (such as personal computer, server, or network device) to perform the methods according to any embodiment of the present invention.

It should be noted that the above descriptions are merely exemplary embodiments of the present invention, and persons having ordinary skill in the art may make various improvements and refinements without departing from the spirit of the invention. All such modifications and refinements are intended to be covered by the present invention.

What is claimed is:

1. A storing method applied to a storage system, wherein the storage system comprises a first Peripheral Component Interconnection Express (PCIE) Input/Output (IO) module, a second PCIE IO module, a first storage device, a second storage device; a first controller, and a second controller, the first controller including a first PCIE switch chip and the second controller including a second PCIE switch chip, wherein the first PCIE switch chip is connected with the first PCIE IO module and the first storage device, the second PCIE switch chip is connected with the second PCIE IO module and the second storage device, the first switch chip is connected with the second switch chip, and the method comprises:

receiving, by the first controller, a request message from a server through a first link across the second PCIE IO module, the second PCIE switch chip and the first PCIE switch chip; and accessing, by the first controller, the second storage device according to the request message.

2. The method according to claim 1, wherein the accessing by the first controller, the second storage device comprises:

storing information corresponding to the request message into the second storage device.

3. The method according to claim 1, wherein the first controller has lighter load than the second controller.

4. The storage method according to claim 3, wherein the load is determined according to at least one of the following parameters:

a controller request number, a controller response time, and a controller Central Processing Unit (CPU) occupancy.

5. The method according to claim 1, wherein the first storage device or the second storage device comprises: a Solid-State Disk (SSD).

6. The method according to claim 1, wherein the accessing, by the first controller, the second storage device according to the request message comprises:

accessing, by the first controller, the second storage device through a second link across the first PCIE switch chip and the second PCIE switch chip according to the request message.

7. The method according to claim 1, wherein the second storage device has a first interface and a second interface, the first interface is connected with the first PCIE switch chip and the second PCIE switch; and the second interface is connected with the second PCIE switch chip; wherein the accessing, by the first controller, the second storage device according to the request message comprises:

accessing, by the first controller, the second storage device through the first interfaces of the second storage device according to the request message.

8. The method according to claim 1, wherein the second storage device has a first interface and a second interface, the first interface is connected with the first PCIE switch chip and the second PCIE switch; and the second interface is connected with the second PCIE switch chip; wherein the accessing, by the first controller, the second storage device according to the request message comprises:

accessing, by the first controller, the second storage device through a second link across the first PCIE switch chip, the second PCIE switch chip, and one of the first interfaces and the second interfaces of the second storage device according to the request message.

9. A storage system, wherein the storage system comprises a first Peripheral Component Interconnection Express (PCIE) Input/Output (IO) module, a second PCIE IO module, a first storage device, a second storage device; a first controller, and a second controller, the first controller including a first PCIE switch chip and the second controller including a second PCIE switch chip, wherein the first PCIE switch chip is connected with the first PCIE IO module and the first storage device, the second PCIE switch chip is connected with the second PCIE IO module and the second storage device, the first switch chip is connected with the second switch chip, and wherein the first controller is configured to receive a request message from a server through a first link across the second PCIE IO module, the second PCIE switch chip and the first PCIE switch chip, and access the second storage devices according to the request message.

10. The storage system according to claim 9, wherein:
the first storage device or the second storage device comprises: a Solid-State Disk (SSD).

11. A controller, applied to a storage system wherein the storage system comprises a first Peripheral Component Interconnection Express (PCIE) Input/Output (IO) module, a second PCIE IO module, a first storage device, a second storage device; a first controller, and a second controller, the first controller including a first PCIE switch chip and the second controller including a second PCIE switch chip, wherein the first PCIE switch chip is connected with the first PCIE IO module and the first storage device, the second PCIE switch chip is connected with the second PCIE IO module and the second storage device, the first switch chip is connected with the second switch chip, and the first controller comprises a processor and the first PCIE switch chip, wherein:
the processor is configured to receive a request message from a server through a first link across the second PCIE IO module, the second PCIE switch chip and the first PCIE switch chip, and access the second storage devices according to the request message;
the first PCIE switch chip is configured to transfer the request message.

12. The controller according to claim 11, wherein the first controller further comprising:
a storage module, configured to store information corresponding to the request message into the second storage devices.

13. The controller according to claim 11, wherein:
the first storage device or the second storage device comprises: a Solid-State Disk (SSD).

* * * * *